Patented Feb. 26, 1935

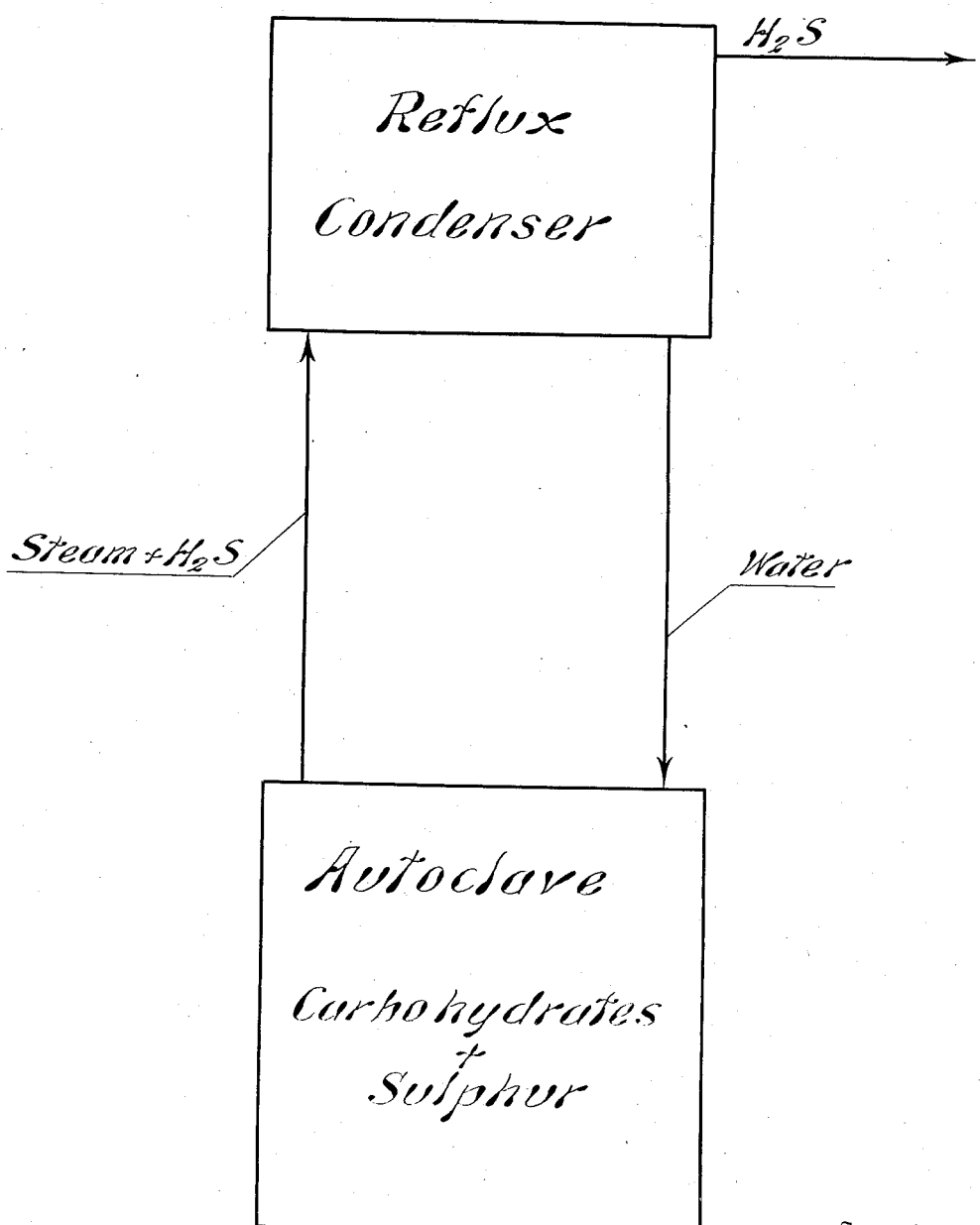

1,992,896

UNITED STATES PATENT OFFICE 1,992,896

PROCESS OF PRODUCING HYDROGEN SULPHIDE

Rudolph S. Bley, Elizabethton, Tenn., assignor to North American Rayon Corporation, New York, N. Y., a corporation of Delaware Application November 16, 1933, Serial No. 698,238

25 Claims. (Cl. 23—181)

The present invention relates to a process of producing hydrogen sulphide of great purity for the manufacture of alkali metal sulphides which are generally used for desulphurizing viscose yarns and the like.

One object of my invention is to economically produce hydrogen sulphide on a large scale from cheap waste materials such as carbohydrates and carbohydrate-containing substances and sulphur.

Another object of my invention is to use artificial silk waste and sulphur for the manufacture of hydrogen sulphide.

A third object of this invention is to produce substantially pure, liquid hydrogen sulphide from carbohydrates and sulphur without further mechanical compression.

I am well aware that it has, heretofore, been proposed to produce hydrogen sulphide by boiling sulphur together with alkalies under pressure, and to develop this compound by heating hydrocarbons with sulphur under normal atmospheric pressures. It has been found, however, that this latter process fails to yield sufficient volumes of gas, and, furthermore, that the raw materials used in this process, in view of the aforementioned poor yields of hydrogen sulphide, become too expensive for commercial purposes.

I have found by experimentation that very high yields of hydrogen sulphide are realized when carbohydrates are heated under superatmospheric pressures with sulphur in the presence or absence of additional water. Any type of material containing carbohydrates, such as saw dust, waste sugars, starches, molasses, cotton waste, peat, plant tissues, artificial silk waste, etc., may be treated with sulphur under pressure to yield hydrogen sulphide. My novel process is especially suitable for the production of this compound from rayon waste, viz. viscose silk, cuprammonium silk, cellulose esters, cellulose ethers, etc. It is to be noted that suitable catalysts, such as metallic oxides, etc., may be added to the reacting mass in order to promote its decomposition and to simultaneously facilitate the union of the final compounds obtained by destructive distillation of a carbohydrate-sulphur mixture under pressure. The residual copper compounds present in copper silk waste represents, per se, valuable catalytic agents and, thus additional agents to catalize the process may be dispensed with.

The attached drawing represents a diagrammatic view of the manner in which my process may be carried out.

It will be noted that I have disclosed, diagrammatically, the manner in which hydrocarbons and sulphur may be heated in an autoclave, the passage of a stream of hydrogen sulphide to the reflux condenser, the passage of the hydrogen sulphide from the condenser, and the return of water and intermediate decomposition products to the autoclave. Since my present invention comprehends only the process for producing the hydrogen sulphide, I have not depicted specifically, any particular apparatus. Any suitable commercial autoclave and condenser may be employed.

Silk waste, for example, and sulphur are charged into an autoclave constructed of hydrogen sulphide resisting material, said autoclave being provided with a pressure gage, safety valve and suitable stirring means. Water, as set forth above, may be added to the carbohydrate-sulphur mass to form a thin paste which can be easily stirred. This autoclave is connected with a reflux condenser of conventional type, the same being provided with adequate cooling means and an outlet for the hydrogen sulphide formed during the reaction. The autoclave is slowly heated by suitable means, i. e. steam coils, etc., under continuous stirring to pressures preferably ranging from 5 to 30 atmospheres, although it is to be noted that the process may be carried out under lower or higher pressure. If the pressures and, consequently the temperatures, are raised above the liquefaction pressure of hydrogen sulphide and the reflux condenser maintained at relatively low temperatures, hydrogen sulphide can be produced in liquid form without additional mechanical compression. The hydrogen sulphide obtained may be purified by any well known means, such as absorbing substances, etc., and/or sodium sulphide may be produced by causing hydrogen sulphide to react with sodium sulphate, etc. The amounts of sulphur and carbohydrate, necessary for production of hydrogen sulphide, depend upon the type of carbohydrate as well as the grade of sulphur used in the reaction. They must be individually determined by experimentation, although it is to be noted that an excess of either one of these substances does not adversely affect the reaction itself. For reasons of economy an excess of sulphur or carbohydrate should be avoided.

It is to be noted that my process is especially adapted for the production of hydrogen sulphide from cellulose sludge present in waste water of rayon plants and paper mills. This fermented or still fermenting sludge contains large amounts of sulphur compounds and cellulose in a finely dispersed state which readily breaks up into hydrogen sulphide on being heated under pressure in the presence of additional sulphur. Thus, the decomposition of carbohydrates by means of sulphur under pressure may be accelerated by adding thereto such cellulose sludge. Waste viscose solutions may be also used in place of cellulose sludge to speed up the formation of hydrogen sulphide.

I wish to point out that the compounds as well as the pressures, set forth above, are merely illustrative and may be varied without departing from the scope and spirit of my invention. No limitations should be imposed upon my invention except as indicated in the appended claims.

I claim:

1. The process of producing hydrogen sulphide from artificial silk waste of cellulosic origin comprising heating said waste under a superatmospheric pressure in the presence of sulphur.

2. The process of producing hydrogen sulphide from artificial silk waste of cellulosic origin comprising heating said waste under pressures of about 5 to 30 atmospheres in the presence of sulphur.

3. The process of producing hydrogen sulphide from artificial silk waste of cellulosic origin comprising heating said waste under a superatmospheric pressure in the presence of sulphur and water.

4. The process of producing hydrogen sulphide from artificial silk waste of cellulosic origin comprising heating said waste under pressures of about 5 to 30 atmospheres in the presence of sulphur and water.

5. The process of producing hydrogen sulphide from artificial silk waste of cellulosic origin comprising heating said waste under a superatmospheric pressure in the presence of sulphur and a catalyst.

6. The process of producing hydrogen sulphide from waste viscose silk comprising heating said silk under a superatmospheric pressure in the presence of sulphur.

7. The process of producing hydrogen sulphide from waste viscose silk comprising heating said silk waste under a superatmospheric pressure in the presence of sulphur and water.

8. The process of producing hydrogen sulphide from waste viscose silk comprising heating said silk waste under a superatmospheric pressure in the presence of sulphur, water and a catalyst.

9. The process of producing sulphide from waste cuprammonium silk comprising heating said silk waste under a superatmospheric pressure in the presence of sulphur.

10. The process of producing hydrogen sulphide from artificial silk waste of cellulosic orgin comprising heating said waste under a superatmospheric pressure in the presence of sulphur, water and a catalyst.

11. The process of producing hydrogen sulphide from artificial silk wase of cellulosic origin comprising heating said waste under a superatmospheric pressure in the presence of sulphur and an accelerator of the group consisting of cellulose sludge and waste viscose solutions.

12. The process of producing hydrogen sulphide from artificial silk waste of cellulosic origin comprising heating said waste under pressures of about 5 to 30 atmospheres in the presence of sulphur and a catalyst.

13. The process of producing hydrogen sulphide from artificial silk waste of cellulosic origin comprising heating said waste under pressures of about 5 to 30 atmospheres in the presence of sulphur, water and a catalyst.

14. The process of producing hydrogen sulphide from artificial silk waste of cellulosic origin comprising heating said waste under pressures of about 5 to 30 atmospheres in the presence of sulphur and an accelerator of the group consisting of cellulose sludge and waste viscose solutions.

15. The process of producing hydrogen sulphide from waste viscose silk comprising heating said silk under a superatmospheric pressure in the presence of sulphur and a catalyst.

16. The process of producing hydrogen sulphide from waste viscose silk comprising heating said silk under a superatmospheric pressure in the presence of sulphur and an accelerator of the group consisting of cellulose sludge and waste viscose solutions.

17. The process of producing hydrogen sulphide from waste viscose silk comprising heating said silk under pressures of about 5 to 30 atmospheres in the presence of sulphur.

18. The process of producing hydrogen sulphide from waste viscose silk comprising heating said silk under pressures of about 5 to 30 atmospheres in the presence of sulphur and a catalyst.

19. The process of producing hydrogen sulphide from waste viscose silk comprising heating said silk under pressures of about 5 to 30 atmospheres in the presence of sulphur and an accelerator of the group consisting of cellulose sludge and waste viscose solutions.

20. The process of producing hydrogen sulphide from waste cuprammonium cellulose silk comprising heating said silk under a superatmospheric pressure in the presence of sulphur and water.

21. The process of producing hydrogen sulphide comprising heating waste cuprammonium cellulose silk containing residual copper compounds under a superatmospheric pressure in the presence of sulphur.

22. The process of producing hydrogen sulphide comprising heating waste cuprammonium cellulose silk containing residual copper compounds under pressures of about 5 to 30 atmospheres in the presence of sulphur.

23. The process of producing hydrogen sulphide from waste cuprammonium silk comprising heating said silk under a superatmospheric pressure in the presence of sulphur and an accelerator of the group consisting of cellulose sludge and waste viscose solutions.

24. The process of producing hydrogen sulphide from waste cuprammonium cellulose silk comprising heating said silk under pressures of about 5 to 30 atmospheres in the presence of sulphur.

25. The process of producing hydrogen sulphide from waste cuprammonium cellulose silk comprising heating said silk under pressures of about 5 to 30 atmospheres in the presence of sulphur and an accelerator of the group consisting of cellulose sludge and waste viscose solutions.

RUDOLPH S. BLEY.